United States Patent
Zhu et al.

(10) Patent No.: US 9,820,271 B2
(45) Date of Patent: Nov. 14, 2017

(54) DOWNLINK INFORMATION SENDING METHOD AND RECEIVING METHOD, BASE STATION, AND USER DEVICE

(71) Applicant: Huawei Technologies Co., Ltd., Shenzhen, Guangdong (CN)

(72) Inventors: Song Zhu, Beijing (CN); Yue Li, Shenzhen (CN); Xiaolong Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 14/934,975

(22) Filed: Nov. 6, 2015

(65) Prior Publication Data
US 2016/0066303 A1    Mar. 3, 2016

Related U.S. Application Data

(63) Continuation of application No. PCT/CN2013/075197, filed on May 6, 2013.

(51) Int. Cl.
*H04W 4/00* (2009.01)
*H04W 72/04* (2009.01)
*H04W 8/26* (2009.01)

(52) U.S. Cl.
CPC .......... *H04W 72/042* (2013.01); *H04W 8/26* (2013.01); *H04W 72/0446* (2013.01)

(58) Field of Classification Search
CPC .................................................. H04W 72/042
USPC ....................................................... 370/329
See application file for complete search history.

(56) References Cited

U.S. PATENT DOCUMENTS

| | | | | |
|---|---|---|---|---|
| 9,425,933 | B2* | 8/2016 | Aiba ................. | H04W 72/042 |
| 2011/0249635 | A1* | 10/2011 | Chen ................ | H04W 76/068 370/329 |
| 2011/0255483 | A1* | 10/2011 | Xu .................... | H04L 25/0232 370/329 |
| 2012/0257513 | A1* | 10/2012 | Yamada ............ | H04L 1/0618 370/248 |
| 2012/0300715 | A1* | 11/2012 | Pelletier .......... | H04W 56/0005 370/329 |

(Continued)

FOREIGN PATENT DOCUMENTS

| | | |
|---|---|---|
| CN | 101998580 A | 3/2011 |
| CN | 102055552 A | 5/2011 |

(Continued)

*Primary Examiner* — Shripal Khajuria

(57) ABSTRACT

The present invention relates to a downlink information sending method, the sending method includes: allocating a cell radio network temporary identifier (C-RNTI) and an extension identifier to first user device user device, where a combination of the extension identifier and the C-RNTI is used to identify the first user device; notifying the first user device of the C-RNTI and the extension identifier; scrambling downlink control information (DCI) of the first user device by using the C-RNTI; and sending the scrambled DCI, where the scrambled DCI carries the C-RNTI and the extension identifier, so that the first user device communicates with a network according to the DCI when determining that the notified C-RNTI and the C-RNTI in the scrambled DCI are the same and the notified extension identifier and the extension identifier carried in the DCI are the same.

18 Claims, 2 Drawing Sheets

(56) References Cited

U.S. PATENT DOCUMENTS

2013/0010619 A1* 1/2013 Fong .................. H04W 74/002
                                                  370/252
2013/0046821 A1  2/2013 Alanara et al.

FOREIGN PATENT DOCUMENTS

| CN | 102595624 A    | 7/2012  |
| CN | 102711056 A    | 10/2012 |
| CN | 102917463 A    | 2/2013  |
| EP | 2658338 B1     | 1/2012  |
| EP | 2 728 928 A1   | 5/2014  |
| WO | WO 2012/044211 A1 | 4/2012 |

* cited by examiner

DOWNLINK INFORMATION SENDING METHOD AND RECEIVING METHOD, BASE STATION, AND USER DEVICE

CROSS-REFERENCE TO RELATED APPLICATIONS

This application is a continuation of International Application No. PCT/CN2013/075197, filed on May 6, 2013, which is hereby incorporated by reference in its entirety.

TECHNICAL FIELD

The present invention relates to wireless communications technologies, and in particular, to a downlink information sending method and receiving method, a base station, and user device.

BACKGROUND

Internet of Things (M2M) is a network that connects, by using information sensing devices, all articles to the Internet to implement intelligent recognition and management. Combined with the Internet, it can implement remote sensing and control of all the articles, thereby generating a production and living system that is more intelligent.

A present cellular communications network is designed for conventional mobile terminals. Using a Long Term Evolution (LTE) system as an example, a length of a cell radio network temporary identifier (C-RNTI) in the present LTE system is 16 bits, and the identifier is used to distinguish and schedule user device, that a present cell can identify a maximum of 65536 ($16^{th}$ power of 2) users at the same time.

In some applications of M2M, for example, smart metering, a density of users of smart metering may be far greater than a density of people, and a single cell even needs to support 100,000 or even more users. Therefore, an existing radio network temporary identifier (RNTI) cannot satisfy a requirement of M2M for multiple services.

SUMMARY

In view of this, embodiments of the present invention provide a downlink information sending method and receiving method, a base station, and user device, to resolve a problem that C-RNTIs in a cellular communications system are insufficient.

According to a first aspect, an embodiment of the present invention provides a downlink information sending method, including:

allocating a cell radio network temporary identifier C-RNTI and an extension identifier to first user device, where a combination of the extension identifier and the C-RNTI is used to identify the first user device;

notifying the first user device of the C-RNTI and the extension identifier;

scrambling downlink control information DCI of the first user device by using the C-RNTI; and sending the scrambled DCI, where the scrambled DCI carries the C-RNTI and the extension identifier, so that the first user device communicates with a network according to the DCI when determining that the notified C-RNTI and the C-RNTI in the scrambled DCI are the same and the notified extension identifier and the extension identifier carried in the DCI are the same; or sending a Medium Access Control control element MAC CE and the scrambled DCI, where the MAC CE carries the extension identifier, so that the first user device communicates with a network according to the DCI when determining that the notified C-RNTI and the C-RNTI in the scrambled DCI are the same and the notified extension identifier and the extension identifier carried in the MAC CE are the same.

With reference to the first aspect, in a first possible implementation manner of the first aspect, the allocating a C-RNTI to first user device includes:

establishing a mapping relationship between C-RNTIs and user devices; and selecting a C-RNTI according to the mapping relationship, to allocate the C-RNTI to user device corresponding to the C-RNTI.

With reference to the first aspect or the first possible implementation manner of the first aspect, in a second possible implementation manner of the first aspect, after the notifying the first user device of the C-RNTI and the extension identifier, the method further includes:

adding the C-RNTI and the extension identifier to a context of the first user device; and reserving the context, to which the C-RNTI and the extension identifier are added, of the first user device.

With reference to the first aspect or any possible implementation manner of the first to second possible implementation manners of the first aspect, in a third possible implementation manner of the first aspect, the method further includes:

if the same C-RNTI is allocated to second user device and the first user device, reallocating a C-RNTI that is different from the C-RNTI allocated to the first user device to the second user device; or if the same C-RNTI is allocated to the first user device and second user device, reallocating a C-RNTI that is different from the C-RNTI allocated to the first user device to the first user device.

With reference to the first aspect, in a fourth possible implementation manner of the first aspect, the allocating a cell radio network temporary identifier C-RNTI and an extension identifier to first user device includes:

using the combination of the C-RNTI and the extension identifier in a configured time frequency resource, to identify the first user device.

With reference to the fourth possible implementation manner of the first aspect, in a fifth possible implementation manner of the first aspect, the sending the C-RNTI and the extension identifier to the first user device further includes:

notifying the first user device of the configured time frequency resource.

According to a second aspect, an embodiment of the present invention provides a downlink information receiving method, including:

receiving a cell radio network temporary identifier C-RNTI and an extension identifier that are allocated to first user device, where a combination of the extension identifier and the C-RNTI is used to identify the first user device; and receiving DCI that is scrambled by using the C-RNTI, where the scrambled DCI carries the C-RNTI and the extension identifier, and communicating with a network according to the DCI when it is determined that the received C-RNTI and the C-RNTI in the scrambled DCI are the same and the received extension identifier and the extension identifier carried in the DCI are the same; or receiving a Medium Access Control control element MAC CE and DCI that is scrambled by using the C-RNTI, where the MAC CE carries the extension identifier, and communicating with a network according to the DCI when it is determined that the received C-RNTI and the C-RNTI in the scrambled DCI are the same and the received extension identifier and the extension identifier carried in the MAC CE are the same.

With reference to the second aspect, in a first possible implementation manner of the second aspect, after the receiving a cell radio network temporary identifier C-RNTI and an extension identifier that are allocated to first user device, the method further includes:

saving the C-RNTI and the extension identifier.

With reference to the second aspect or the first possible implementation manner of the second aspect, in a second possible implementation manner of the second aspect, the method further includes:

receiving a notified time frequency resource configuration;

the communicating with a network according to the DCI when it is determined that the received C-RNTI and the C-RNTI in the scrambled DCI are the same and the received extension identifier and the extension identifier carried in the DCI are the same includes:

communicating with the network according to the DCI when it is determined in the notified time frequency resource configuration that the received C-RNTI and the C-RNTI in the scrambled DCI are the same and the received extension identifier and the extension identifier carried in the DCI are the same; and the communicating with a network according to the DCI when it is determined that the received C-RNTI and the C-RNTI in the scrambled DCI are the same and the received extension identifier and the extension identifier carried in the MAC CE are the same includes:

communicating with the network according to the DCI when it is determined in the notified time frequency resource configuration that the received C-RNTI and the C-RNTI in the scrambled DCI are the same and the received extension identifier and the extension identifier carried in the MAC CE are the same.

According to a third aspect, an embodiment of the present invention provides a base station, including:

an allocation unit, configured to allocate a cell radio network temporary identifier C-RNTI and an extension identifier to first user device, where a combination of the extension identifier and the C-RNTI is used to identify the first user device;

a notification unit, configured to notify the first user device of the C-RNTI and the extension identifier that are allocated by the allocation unit;

a scrambling unit, configured to scramble downlink control information DCI of the first user device by using the C-RNTI allocated by the allocation unit; and a sending unit, configured to send the DCI scrambled by the scrambling unit to the first user device, where the scrambled DCI carries the C-RNTI and the extension identifier, so that the first user device communicates with a network according to the DCI when determining that the C-RNTI notified by the notification unit and the C-RNTI in the scrambled DCI are the same and the extension identifier notified by the notification unit and the extension identifier carried in the DCI are the same, or configured to send a Medium Access Control control element MAC CE and the DCI that is scrambled by the scrambling unit to the first user device, where the MAC CE carries the extension identifier, so that the first user device communicates with a network according to the DCI when determining that the C-RNTI notified by the notification unit and the C-RNTI in the scrambled DCI are the same and the extension identifier notified by the notification unit and the extension identifier carried in the MAC CE are the same.

With reference to the third aspect, in a first possible implementation manner of the third aspect, the allocation unit includes:

a mapping subunit, configured to establish a mapping relationship between C-RNTIs and user devices; and a selection subunit, configured to select a C-RNTI according to the mapping relationship established by the mapping subunit, to allocate the C-RNTI to user device corresponding to the C-RNTI.

With reference to the third aspect or the first possible implementation manner of the third aspect, in a second possible implementation manner of the third aspect, the base station further includes:

an adding unit, configured to add the C-RNTI and the extension identifier to a context of the first user device after the notification unit notifies the first user device of the C-RNTI and the extension identifier; and a reserving unit, configured to reserve the context, to which the C-RNTI and the extension identifier are added by the adding unit, of the first user device.

With reference to the third aspect or any possible implementation manner of the first to second possible implementation manners of the third aspect, in a third possible implementation manner of the third aspect, the base station further includes:

a reallocation unit, configured to: when the same C-RNTI is allocated to second user device and the first user device, reallocate a C-RNTI that is different from the C-RNTI allocated to the first user device to the second user device, or configured to: when the same C-RNTI is allocated to the first user device and second user device, reallocate a C-RNTI that is different from the C-RNTI allocated to the first user device to the first user device.

With reference to the third aspect, in a fourth possible implementation manner of the third aspect, the allocation unit includes:

a time frequency configuration subunit, configured to configure a time frequency resource; and an identification subunit, configured to use the combination of the C-RNTI and the extension identifier in the time frequency resource configured by the time frequency configuration subunit, to identify the first user device.

With reference to the fourth possible implementation manner of the third aspect, in a fifth possible implementation manner of the third aspect, the notification unit further includes:

a time frequency notification subunit, configured to notify the first user device of the time frequency resource configured by the time frequency configuration subunit.

According to a fourth aspect, an embodiment of the present invention provides user device receiving downlink information, including:

a receiving unit, configured to receive a cell radio network temporary identifier C-RNTI and an extension identifier that are allocated to first user device, where a combination of the extension identifier and the C-RNTI is used to identify the first user device, where the receiving unit is configured to receive DCI that is scrambled by using the C-RNTI, where the scrambled DCI carries the C-RNTI and the extension identifier, or is configured to receive a Medium Access Control control element MAC CE and DCI that is scrambled by using the C-RNTI, where the MAC CE carries the extension identifier; and a processing unit, configured to communicate with a network according to the DCI when it is determined that the C-RNTI received by the receiving unit and the C-RNTI in the scrambled DCI are the same and the extension identifier received by the receiving unit and the extension identifier carried in the DCI are the same, or configured to communicate with a network according to the DCI when it is determined that the C-RNTI received by the receiving unit and the C-RNTI in the scrambled DCI are the same and the extension identifier received by the receiving unit and the extension identifier carried in the MAC CE are the same.

With reference to the fourth aspect, in a first possible implementation manner of the fourth aspect, the user device further includes:

a saving unit, configured to save the C-RNTI and the extension identifier after the receiving unit receives the cell radio network temporary identifier C-RNTI and the extension identifier that are allocated to the first user device.

With reference to the fourth aspect, in a second possible implementation manner of the fourth aspect, the receiving unit is configured to receive a notified time frequency resource configuration; and the processing unit is configured to communicate with the network according to the DCI when it is determined in the time frequency resource configuration received by the receiving unit that the C-RNTI received by the receiving unit and the C-RNTI in the scrambled DCI are the same and the extension identifier received by the receiving unit and the extension identifier carried in the DCI are the same, or is configured to communicate with the network according to the DCI when it is determined in the time frequency resource configuration received by the receiving unit that the C-RNTI received by the receiving unit and the C-RNTI in the scrambled DCI are the same and the extension identifier received by the receiving unit and the extension identifier carried in the MAC CE are the same.

According to a fifth aspect, an embodiment of the present invention provides a base station, including:

a processor, configured to allocate a cell radio network temporary identifier C-RNTI and an extension identifier to first user device, where a combination of the extension identifier and the C-RNTI is used to identify the first user device; and a transmitter, configured to notify the first user device of the C-RNTI and the extension identifier that are allocated by the processor, where the processor is configured to scramble downlink control information DCI of the first user device by using the C-RNTI allocated to the first user device; and the transmitter is configured to send the DCI scrambled by the processor to the first user device, where the scrambled DCI carries the C-RNTI and the extension identifier, so that the first user device communicates with a network according to the DCI when determining that the notified C-RNTI and the C-RNTI in the scrambled DCI are the same and the notified extension identifier and the extension identifier carried in the DCI are the same, or is configured to send a Medium Access Control control element MAC CE and the DCI that is scrambled by the processor to the first user device, where the MAC CE carries the extension identifier, so that the first user device communicates with a network according to the DCI when determining that the notified C-RNTI and the C-RNTI in the scrambled DCI are the same and the notified extension identifier and the extension identifier carried in the MAC CE are the same.

With reference to the fifth aspect, in a first possible implementation manner of the fifth aspect, the processor is specifically configured to:

establish a mapping relationship between C-RNTIs and user devices; and select a C-RNTI according to the mapping relationship, to allocate the C-RNTI to user device corresponding to the C-RNTI.

With reference to the fifth aspect or the first possible implementation manner of the fifth aspect, in a second possible implementation manner of the fifth aspect, the processor is further configured to:

add the C-RNTI and the extension identifier to a context of the first user device after the transmitter notifies the first user device of the C-RNTI and the extension identifier; and reserve the context, to which the C-RNTI and the extension identifier are added, of the first user device.

With reference to the fifth aspect or any possible implementation manner of the first to second possible implementation manners of the fifth aspect, in a third possible implementation manner of the fifth aspect, the processor is further configured to:

if the same C-RNTI is allocated to second user device and the first user device, reallocate a C-RNTI that is different from the C-RNTI allocated to the first user device to the second user device, or is configured to: when the same C-RNTI is allocated to the first user device and second user device, reallocate a C-RNTI that is different from the C-RNTI allocated to the first user device to the first user device.

With reference to the fifth aspect, in a fourth possible implementation manner of the fifth aspect, the processor is further configured to:

use the combination of the C-RNTI and the extension identifier in a configured time frequency resource, to identify the first user device.

With reference to the fourth possible implementation manner of the fifth aspect, in a fifth possible implementation manner of the fifth aspect, the transmitter is further configured to:

notify the first user device of the configured time frequency resource.

According to a sixth aspect, an embodiment of the present invention provides user device, including:

a receiver, configured to receive a cell radio network temporary identifier C-RNTI and an extension identifier that are allocated to first user device, where a combination of the extension identifier and the C-RNTI is used to identify the first user device, where the receiver is configured to receive DCI that is scrambled by using the C-RNTI, where the scrambled DCI carries the C-RNTI and the extension identifier, or is configured to receive a Medium Access Control control element MAC CE and DCI that is scrambled by using the C-RNTI, where the MAC CE carries the extension identifier; and a processor, configured to communicate with a network according to the DCI when it is determined that the C-RNTI received by the receiver and the C-RNTI in the scrambled DCI are the same and the extension identifier received by the receiver and the extension identifier carried in the DCI are the same, or configured to communicate with a network according to the DCI when it is determined that the C-RNTI received by the receiver and the C-RNTI in the scrambled DCI are the same and the extension identifier received by the receiver and the extension identifier carried in the MAC CE are the same.

With reference to the sixth aspect, in a first possible implementation manner of the sixth aspect, the processor is further configured to:

save the C-RNTI and the extension identifier after the receiver receives the cell radio network temporary identifier C-RNTI and the extension identifier that are allocated to the first user device.

With reference to the sixth aspect, in a second possible implementation manner of the sixth aspect, the receiver is configured to receive a notified time frequency resource configuration; and the processor is configured to communicate with the network according to the DCI when it is determined in the time frequency resource configuration received by the receiver that the C-RNTI received by the receiver and the C-RNTI in the scrambled DCI are the same and the extension identifier received by the receiver and the extension identifier carried in the DCI are the same, or is configured to communicate with the network according to the DCI when it is determined in the time frequency resource configuration received by the receiver that the C-RNTI received by the receiver and the C-RNTI in the scrambled DCI are the same and the extension identifier received by the receiver and the extension identifier carried in the MAC CE are the same.

According to a seventh aspect, an embodiment of the present invention provides a computer program product, including a computer readable medium, where the readable medium includes a group of program code, configured to execute any downlink information sending method in the foregoing, or configured to execute any downlink information receiving method in the foregoing.

In the foregoing embodiments, a cell radio network temporary identifier C-RNTI and an extension identifier are allocated to first user device, where a combination of the extension identifier and the C-RNTI is used to identify the first user device; the first user device is notified of the C-RNTI and the extension identifier; downlink control information DCI of the first user device is scrambled by using the C-RNTI; and the scrambled DCI is sent, where the scrambled DCI carries the C-RNTI and the extension identifier, so that the first user device communicates with a network according to the DCI when determining that the notified C-RNTI and the C-RNTI in the scrambled DCI are the same and the notified extension identifier and the extension identifier carried in the DCI are the same; or a Medium Access Control control element MAC CE and the scrambled DCI are sent, where the MAC CE carries the extension identifier, so that the first user device communicates with a network according to the DCI when determining that the notified C-RNTI and the C-RNTI in the scrambled DCI are the same and the notified extension identifier and the extension identifier carried in the MAC CE are the same. In this way, a problem that C-RNTIs in a cellular communications system are insufficient is resolved, so that a capacity of a wireless communications network can be expanded to accommodate more users, thereby avoiding a problem in the prior art that user device is distinguished by using only a C-RNTI and a requirement of M2M for multiple services cannot be satisfied.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
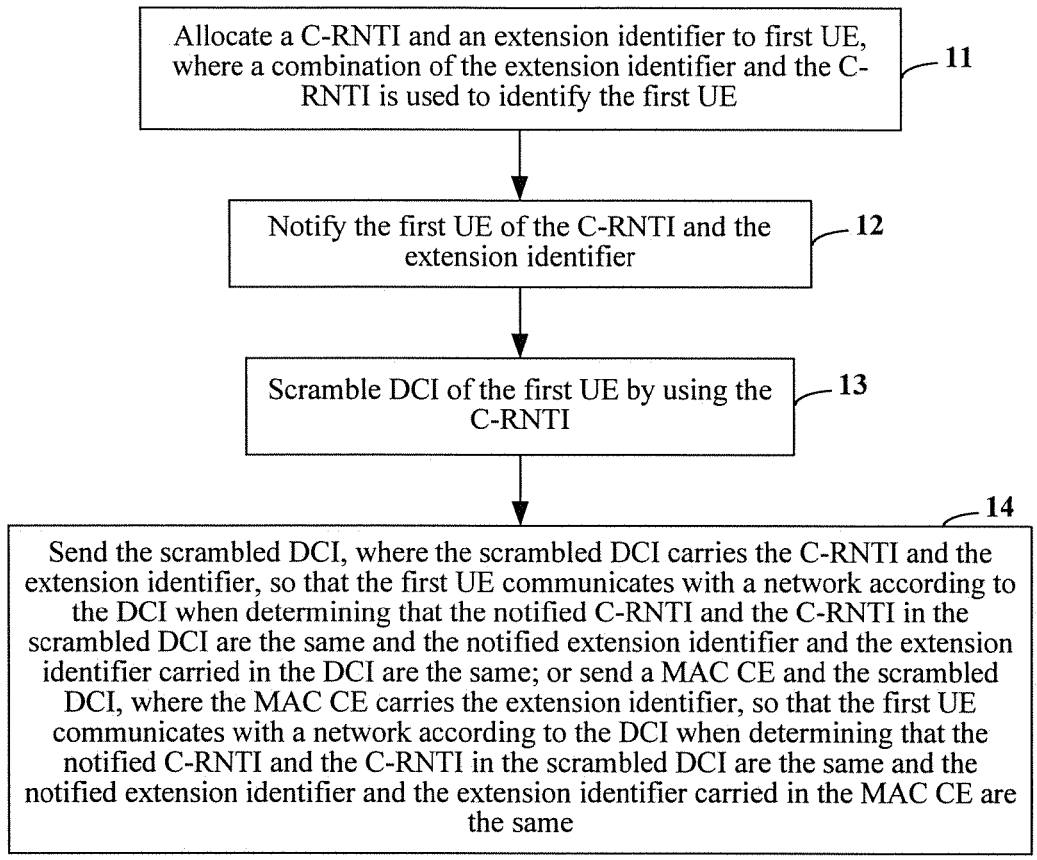
FIG. 1 is a flowchart of a downlink information sending method according to an embodiment of the present invention.

FIG. 1 is a flowchart of a downlink information sending method according to an embodiment of the present invention. This embodiment is a processing procedure on a base station side, and includes:

Step 11: Allocate a C-RNTI and an extension identifier to first user device (User device, user device), where a combination of the extension identifier and the C-RNTI is used to identify the first user device.

For example, a base station may establish a mapping relationship between C-RNTIs and user devices, and select a C-RNTI according to the mapping relationship, to allocate the C-RNTI to user device corresponding to the C-RNTI. Similarly, the C-RNTI allocated to the first user device is a C-RNTI corresponding to the first user device in a mapping relationship table. The C-RNTI corresponding to the first user device may be any C-RNTI, or may be a C-RNTI among some preset C-RNTIs. When the C-RNTI corresponding to the first user device is a C-RNTI among some preset C-RNTIs, it can be avoided that the C-RNTI of the first user device is the same as a C-RNTI of another user device. The preset C-RNTIs may be C-RNTIs reserved by the base station for special user devices such as M2M terminals, and the rest C-RNTIs are used for conventional user devices.

For another example, the base station may configure a time frequency resource for the first user device, and use the combination of the extension identifier and the C-RNTI in the configured time frequency resource, to identify the first user device.

The extension identifier may be a cell identity (Identity, ID), or may be an indication indicating that the user device is different from conventional user device or the like; the ID may be an existing ID or some of existing IDs, or may be a new ID.

Step 12: Notify the first user device of the C-RNTI and the extension identifier, so that the first user device can receive a data packet of the first user device according to the C-RNTI and the extension identifier.

Step 13: Scramble downlink control information (DCI) of the first user device by using the C-RNTI. Specifically, an exclusive OR operation may be performed on the C-RNTI and a cyclic redundancy check (CRC) code of the downlink control information of the first user device.

Step 14: Send the scrambled DCI in step 13, where the scrambled DCI carries the C-RNTI and the extension identifier, so that the first user device communicates with a network according to the DCI when determining that the notified C-RNTI in step 12 and the C-RNTI in the scrambled DCI in step 13 are the same and the notified extension identifier in step 12 and the extension identifier carried in the DCI are the same; or send a Medium Access Control control element MAC CE (Medium Access Control Control Element, MAC CE) and the scrambled DCI, where the MAC CE carries the extension identifier, so that the first user device communicates with a network according to the DCI when determining that the notified C-RNTI in step 12 and the C-RNTI in the scrambled DCI in step 13 are the same and the notified extension identifier in step 12 and the extension identifier carried in the MAC CE are the same.

When the base station configures a time frequency resource for the first user device and uses the combination of the C-RNTI and the extension identifier in the time frequency resource to identify the first user device, the sending, by the base station, the C-RNTI and the extension identifier to the first user device may further include: notifying the first user device of the configured time frequency resource. In this way, when receiving the extension identifier in the configured time frequency resource, the first user device can determine that the received extension identifier is allocated to the first user device. This sending manner is an implicit manner, and it should be noted that the implicit manner is not limited thereto.

Alternatively, the base station may send the extension identifier by sending the DCI or the MAC CE that carries the extension identifier. This sending manner is an explicit manner, and it should be noted that the explicit manner is not limited thereto.

Further, after the notifying the first user device of the C-RNTI and the extension identifier, the method may further include:

adding the C-RNTI and the extension identifier to a context of the first user device, to save the C-RNTI and the extension identifier; and reserving the context of the first user device. In this way, the base station can obtain, from the reserved context of the first user device, the C-RNTI and the extension identifier that are previously allocated to the first user device, and then implement, when the downlink control information DCI needs to be sent to the first user device, sending of the downlink control information by sending the C-RNTI and the extension identifier of the first user device.

Further, the downlink information sending method provided in this embodiment of the present invention may further include:

if the same C-RNTI is allocated to second user device and the first user device, reallocating a C-RNTI that is different from the C-RNTI allocated to the first user device to the second user device; or if the same C-RNTI is allocated to the first user device and second user device, reallocating a C-RNTI that is different from the C-RNTI allocated to the first user device to the first user device, to avoid a conflict between the first user device and the second user device.

In the foregoing embodiment, a base station identifies user device by using a combination of a C-RNTI and an extension identifier, thereby resolving a problem that C-RNTIs in a cellular communications system are insufficient, so that a capacity of a wireless communications network can be expanded to accommodate more users, and avoiding a problem in the prior art that user device is distinguished by using only a C-RNTI and a requirement of M2M for multiple services cannot be satisfied.

Figure 2:
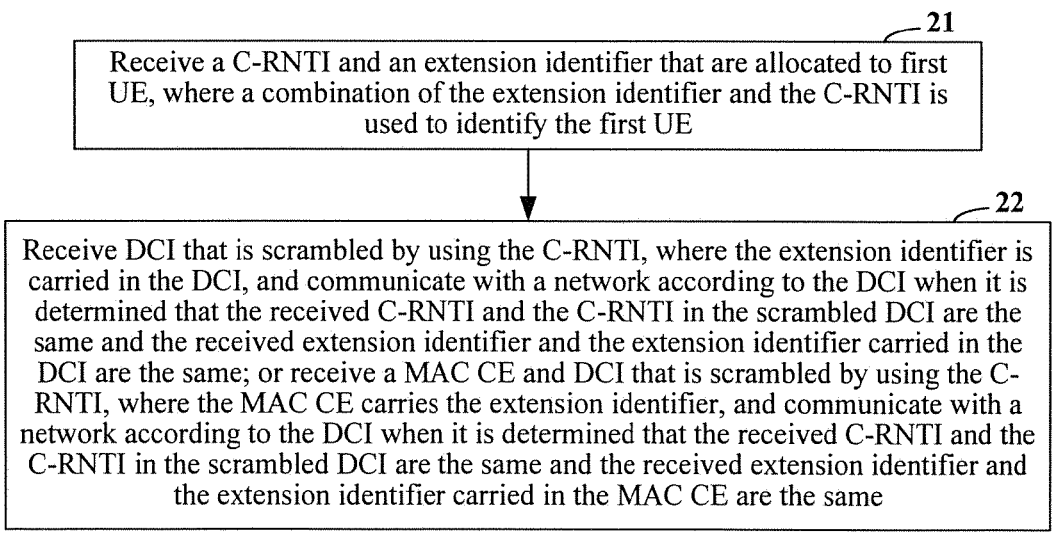
FIG. 2 is a flowchart of a downlink information receiving method according to another embodiment provided in the present invention.

FIG. 2 is a flowchart of a downlink information receiving method according to another embodiment of the present invention. This embodiment is a processing procedure on a user device side, and includes:

Step 21: Receive a C-RNTI and an extension identifier that are allocated to first user device, where a combination of the extension identifier and the C-RNTI is used to identify the first user device. For details about the C-RNTI and the extension identifier, refer to the description in the embodiment shown in FIG. 1.

For example, the receiving an extension identifier may include: receiving the extension identifier in an explicit manner or an implicit manner. For details about the implicit manner and the explicit manner, refer to the description in the embodiment shown in FIG. 1.

For example, the receiving the extension identifier in an explicit manner may include: receiving the extension identifier by receiving DCI or a MAC CE that carries the extension identifier.

Step 22: Receive DCI that is scrambled by using the C-RNTI, where the extension identifier is carried in the DCI, and communicate with a network according to the DCI when it is determined that the received C-RNTI in step 21 and the C-RNTI in the scrambled DCI are the same and the received extension identifier in step 21 and the extension identifier carried in the DCI are the same; or receive a MAC CE and DCI that is scrambled by using the C-RNTI, where the MAC CE carries the extension identifier, and communicate with a network according to the DCI when it is determined that the received C-RNTI in step 21 and the C-RNTI in the scrambled DCI are the same and the received extension identifier in step 21 and the extension identifier carried in the MAC CE are the same.

Further, after the receiving a C-RNTI and an extension identifier that are allocated to first user device, the method may further include:

saving the C-RNTI and the extension identifier, to determine whether received DCI belongs to the user device or whether a received data packet belongs to the user device.

For example, the user device may determine, according to an extension identifier carried in DCI, whether the DCI belongs to the user device, and perform a subsequent operation according to the extension identifier in the DCI if the DCI belongs to the user device, otherwise ignore the DCI, or may determine, according to an extension identifier carried in a MAC CE, whether to perform a subsequent operation, such as receiving downlink data.

Further, the downlink information receiving method provided in this embodiment of the present invention may further include:

receiving a notified time frequency resource configuration;

the communicating with a network according to the DCI when it is determined that the C-RNTI and the C-RNTI in the scrambled DCI are the same and the received extension identifier and the extension identifier carried in the DCI are the same may include:

communicating with the network according to the DCI when it is determined in the notified time frequency resource configuration that the C-RNTI and the C-RNTI in the scrambled DCI are the same and the received extension identifier and the extension identifier carried in the DCI are the same; and the communicating with a network according to the DCI when it is determined that the received C-RNTI and the C-RNTI in the scrambled DCI are the same and the received extension identifier and the extension identifier carried in the MAC CE are the same may include:

communicating with the network according to the DCI when it is determined in the notified time frequency resource configuration that the received C-RNTI and the C-RNTI in the scrambled DCI are the same and the received extension identifier and the extension identifier carried in the MAC CE are the same.

In the foregoing embodiment, user device receives a C-RNTI and an extension identifier, and determines, according to a combination of the C-RNTI and the extension identifier, whether to perform a subsequent processing operation, thereby achieving an objective of distinguishing the user device on a base station side. Compared with the prior art in which user device is distinguished by using a C-RNTI, more user devices can be distinguished, and a problem that an existing C-RNTI cannot satisfy a requirement for distinguishing user devices of highly dense users is resolved. Therefore, a problem that C-RNTIs in a future cellular communications system are insufficient is resolved, so that a wireless communications network can accommodate more users.

Another embodiment provided in the present invention is similar to the foregoing embodiments, and a difference lies in that a base station allocates a C-RNTI and a new extension identifier to special user device.

The special user device includes but is not limited to a type of user device that is in or can be in a special state. The new extension identifier may be an existing ID, such as a cell ID, or may be a new ID, or may be an indication message that indicates a type or a capability of the user device.

The special state refers to that the base station reserves contexts (context) of some user devices to identify the user devices, but does not allocate dedicated radio link resources to the user devices. No dedicated radio link resource is allocated to user device in this state, but an identifier of this type of user device is saved in a wireless network, and if necessary, this type of user device can quickly enter, by using the identifier, an RRC connected state, which is similar to a type of special out-of-synchronization state or special IDLE (idle) state. For example, for special user device, an eNB adds a C-RNTI and a new extension identifier to a context of the user device, and reserves the context of the user device, but does not allocate any other dedicated radio resource to the user device.

The base station uses a C-RNTI and a new extension identifier in a user device Context reserved by the base station, so that user device in a special state can be triggered and connected to an LTE system.

When sending downlink control information (Downlink Control Information, DCI), the base station scrambles cyclic redundancy check, (CRC) of the DCI by using the C-RNTI in the user device context reserved by the base station, and notifies corresponding special user device in a pre-agreed radio resource.

The base station further extends the DCI, and includes a corresponding new extension identifier of the user device in the DCI, to indicate a real user that receives the new DCI.

Optionally, a corresponding extension identifier of the user device may also be carried in a corresponding MAC CE (control element), to indicate a real user that receives the DCI.

Another embodiment provided in the present invention is similar to the foregoing embodiments, and a difference lies in that in an actual system, a C-RNTI may be reused in a proper situation, so as to further increase a quantity of available C-RNTIs.

For special user device, when sending downlink information, an eNB first allocates a C-RNTI and an extension identifier to the special user device. For details about the special user device, refer to the description in the foregoing embodiment.

The eNB reserves the allocated C-RNTI and extension identifier in a context of the special user device.

When some user devices need to be or are about to be in a special out-of-synchronization state or a special IDLE state, the eNB saves contexts of the special user devices.

After the special user device enters a special out-of-synchronization state or a special IDLE state, the eNB may allocate the C-RNTI of the user device to another user device, because at this time, the special user device is identified by using a combination of the C-RNTI and the extension identifier.

When needing to trigger the special user device, the eNB may trigger the special user device by using the saved user device context, so that the special user device is synchronous with a network side again.

Specifically, CRC of DCI of the special user device is scrambled by using the C-RNTI in the saved user device context, and the special user device is further distinguished by using the extension identifier.

When distinguishing the special user device by using the extension identifier, the eNB may add the extension identifier to the DCI or add the extension identifier to a MAC CE.

Further, the foregoing method may be used only when this type of special user device is a special state, and after this type of user device establishes an RRC connection or is triggered to enter an RRC connected state, the user device may no longer be identified by using the foregoing method. Instead, the user device is identified by using a normal C-RNTI, and a subsequent operation is performed. Specifically, when this type of user device enters an RRC connected state, if a previously allocated C-RNTI is not allocated to another user device, the C-RNTI is changed into a normal C-RNTI and is used; if the C-RNTI is already allocated to another user device, the base station reallocates a C-RNTI that is not yet used to the user device for use, or allocates a C-RNTI that is not yet used to another user device, and changes the C-RNTI into a normal C-RNTI for use by the special user device.

On a user device side, user device first listens on a PDCCH according to an existing procedure, and performs the following operations when receiving DCI information that is scrambled by using a C-RNTI allocated by the base station to the user device:

decoding the DCI, determining, according to an extension identifier included in the DCI, whether the received DCI is DCI that belongs to the user device, and if yes, performing, by the user device according to the extension identifier in the DCI, a normal subsequent operation, such as receiving data or sending data; otherwise, ignoring the DCI.

If the extension identifier is included in a MAC CE (MAC control element), the user device decodes received data according to an existing DCI processing procedure, to acquire the extension identifier carried in the MAC CE. The user device determines, according to the extension identifier that is carried in the MAC CE and is obtained after decoding, whether a data packet belongs to the user device, and if yes, performs a normal operation on a MAC layer, such as decoding a PDU (packet data unit) at the MAC layer or acquiring an SDU (service data unit); otherwise, ignores and discards the data packet.

Another embodiment provided in the present invention is similar to the foregoing embodiments, and a difference lies in that an eNB may reserve some C-RNTIs for dedicated use by conventional user devices, and some other C-RNTIs may be used in the method in the foregoing embodiment.

Another embodiment provided in the present invention is similar to the foregoing embodiments, and a difference lies in that an eNB may distinguish special user device by sending DCI or a MAC CE by using a preset time frequency resource.

Another embodiment provided in the present invention is similar to the foregoing embodiments, and a difference lies in that when finding that a conflict may occur between C-RNTIs of user device in a connected state and user device in a special state, an eNB may reallocate a new C-RNTI to the user device in a connected state.

Figure 3:
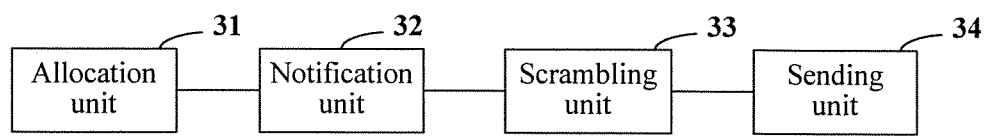
FIG. 3 is a schematic structural diagram of a base station according to another embodiment of the present invention.

FIG. 3 is a schematic structural diagram of a base station according to another embodiment of the present invention. The base station provided in this embodiment is configured to implement the method shown in FIG. 1, and includes: an allocation unit 31, a notification unit 32, a scrambling unit 33, and a sending unit 34.

The allocation unit 31 is configured to allocate a cell radio network temporary identifier C-RNTI and an extension identifier to first user device, where a combination of the extension identifier and the C-RNTI is used to identify the first user device;

the notification unit 32 is configured to notify the first user device of the C-RNTI and the extension identifier that are allocated by the allocation unit 31;

the scrambling unit 33 is configured to scramble downlink control information DCI of the first user device by using the C-RNTI allocated by the allocation unit 31; and the sending unit 34 is configured to send the DCI scrambled by the scrambling unit 33 to the first user device, where the scrambled DCI carries the C-RNTI and the extension identifier, so that the first user device communicates with a network according to the DCI when determining that the C-RNTI notified by the notification unit 32 and the C-RNTI in the scrambled DCI are the same and the extension identifier notified by the notification unit 32 and the extension identifier carried in the DCI are the same, or configured to send a Medium Access Control control element MAC CE and the DCI that is scrambled by the scrambling unit 33 to the first user device, where the MAC CE carries the extension identifier, so that the first user device communicates with a network according to the DCI when determining that the C-RNTI notified by the notification unit 32 and the C-RNTI in the scrambled DCI are the same and the extension identifier notified by the notification unit 32 and the extension identifier carried in the MAC CE are the same.

The allocation unit 31 may include:
a mapping subunit, configured to establish a mapping relationship between C-RNTIs and user devices; and a selection subunit, configured to select a C-RNTI according to the mapping relationship established by the mapping subunit, to allocate the C-RNTI to user device corresponding to the C-RNTI.

Further, the base station provided in this embodiment of the present invention may further include:
an adding unit, configured to add the C-RNTI and the extension identifier to a context of the first user device after the notification unit 32 notifies the first user device of the C-RNTI and the extension identifier; and
a reserving unit, configured to reserve the context, to which the C-RNTI and the extension identifier are added by the adding unit, of the first user device.

Further, the base station provided in this embodiment of the present invention may further include:
a reallocation unit, configured to: when the same C-RNTI is allocated to second user device and the first user device, reallocate a C-RNTI that is different from the C-RNTI allocated to the first user device to the second user device, or configured to: when the same C-RNTI is allocated to the first user device and second user device, reallocate a C-RNTI that is different from the C-RNTI allocated to the first user device to the first user device.

The allocation unit 31 may include:
a time frequency configuration subunit, configured to configure a time frequency resource; and
an identification subunit, configured to use the combination of the C-RNTI and the extension identifier in the time frequency resource configured by the time frequency configuration subunit, to identify the first user device.

Further, the notification unit 32 may further include:
a time frequency notification subunit, configured to notify the first user device of the time frequency resource configured by the time frequency configuration subunit.

In the foregoing base station embodiment, user device is identified by using a combination of a C-RNTI and an extension identifier, thereby resolving a problem that C-RNTIs in a cellular communications system are insufficient, so that a capacity of a wireless communications network can be expanded to accommodate more users, and avoiding a problem in the prior art that user device is distinguished by using only a C-RNTI and a requirement of M2M for multiple services cannot be satisfied.

Figure 4:
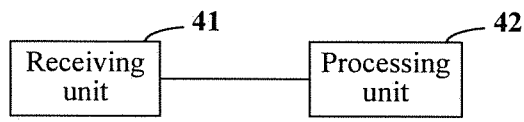
FIG. 4 is a schematic structural diagram of user device receiving downlink information according to another embodiment of the present invention.

FIG. 4 is a schematic structural diagram of user device receiving downlink information according to another embodiment of the present invention. The user device provided in this embodiment is configured to implement the method shown in FIG. 2, and includes: a receiving unit 41 and a processing unit 42.

The receiving unit 41 is configured to receive a cell radio network temporary identifier C-RNTI and an extension identifier that are allocated to first user device, where a combination of the extension identifier and the C-RNTI is used to identify the first user device, where the receiving unit 41 is configured to receive DCI that is scrambled by using the C-RNTI, where the scrambled DCI carries the C-RNTI and the extension identifier, or is configured to receive a Medium Access Control control element MAC CE and DCI that is scrambled by using the C-RNTI, where the MAC CE carries the extension identifier; and the processing unit 42 is configured to communicate with a network according to the DCI when it is determined that the C-RNTI received by the receiving unit 41 and the C-RNTI in the scrambled DCI are the same and the extension identifier received by the receiving unit 41 and the extension identifier carried in the DCI are the same, or configured to communicate with a network according to the DCI when it is determined that the C-RNTI received by the receiving unit 41 and the C-RNTI in the scrambled DCI are the same and the extension identifier received by the receiving unit 41 and the extension identifier carried in the MAC CE are the same.

Further, the user device provided in this embodiment of the present invention may further include:

a saving unit, configured to save the C-RNTI and the extension identifier after the receiving unit 41 receives the cell radio network temporary identifier C-RNTI and the extension identifier that are allocated to the first user device.

Further, the receiving unit 41 is further configured to receive a notified time frequency resource configuration.

Further, the processing unit 42 is configured to communicate with the network according to the DCI when it is determined in the time frequency resource configuration received by the receiving unit 41 that the C-RNTI received by the receiving unit 41 and the C-RNTI in the scrambled DCI are the same and the extension identifier received by the receiving unit 41 and the extension identifier carried in the DCI are the same, or is configured to communicate with the network according to the DCI when it is determined in the time frequency resource configuration received by the receiving unit 41 that the C-RNTI received by the receiving unit 41 and the C-RNTI in the scrambled DCI are the same and the extension identifier received by the receiving unit 41 and the extension identifier carried in the MAC CE are the same.

In the foregoing user device embodiment, user device is identified by using a combination of a C-RNTI and an extension identifier, thereby resolving a problem that C-RNTIs in a cellular communications system are insufficient, so that a capacity of a wireless communications network can be expanded to accommodate more users, and avoiding a problem in the prior art that user device is distinguished by using only a C-RNTI and a requirement of M2M for multiple services cannot be satisfied.

Figure 5:
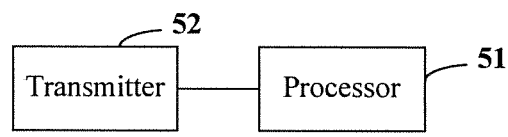
FIG. 5 is a schematic structural diagram of a base station according to another embodiment of the present invention.

FIG. 5 is a schematic structural diagram of a base station according to another embodiment of the present invention. The base station is configured to implement the method shown in FIG. 1, and includes: a processor 51 and a transmitter 52.

The processor 51 is configured to allocate a cell radio network temporary identifier C-RNTI and an extension identifier to first user device, where a combination of the extension identifier and the C-RNTI is used to identify the first user device; and the transmitter 52 is configured to notify the first user device of the C-RNTI and the extension identifier that are allocated by the processor 51, where the processor 51 is configured to scramble downlink control information DCI of the first user device by using the C-RNTI allocated to the first user device; and the transmitter 52 is configured to send the DCI scrambled by the processor 51 to the first user device, where the scrambled DCI carries the C-RNTI and the extension identifier, so that the first user device communicates with a network according to the DCI when determining that the notified C-RNTI and the C-RNTI in the scrambled DCI are the same and the notified extension identifier and the extension identifier carried in the DCI are the same, or is configured to send a Medium Access Control control element MAC CE and the DCI that is scrambled by the processor 51 to the first user device, where the MAC CE carries the extension identifier, so that the first user device communicates with a network according to the DCI when determining that the notified C-RNTI and the C-RNTI in the scrambled DCI are the same and the notified extension identifier and the extension identifier carried in the MAC CE are the same.

The processor 51 may be specifically configured to:

establish a mapping relationship between C-RNTIs and user devices; and select a C-RNTI according to the mapping relationship, to allocate the C-RNTI to user device corresponding to the C-RNTI.

Further, the processor 51 may be further configured to:

add the C-RNTI and the extension identifier to a context of the first user device after the transmitter 52 notifies the first user device of the C-RNTI and the extension identifier; and reserve the context, to which the C-RNTI and the extension identifier are added, of the first user device.

Further, the processor 51 may be further configured to:

if the same C-RNTI is allocated to second user device and the first user device, reallocate a C-RNTI that is different from the C-RNTI allocated to the first user device to the second user device, or is configured to: when the same C-RNTI is allocated to the first user device and second user device, reallocate a C-RNTI that is different from the C-RNTI allocated to the first user device to the first user device.

Further, the processor 51 may be further configured to:

use the combination of the C-RNTI and the extension identifier in a configured time frequency resource, to identify the first user device.

Further, the transmitter 52 may be further configured to:

notify the first user device of the configured time frequency resource.

In the foregoing base station embodiment, user device is identified by using a combination of a C-RNTI and an extension identifier, thereby resolving a problem that C-RNTIs in a cellular communications system are insufficient, so that a capacity of a wireless communications network can be expanded to accommodate more users, and avoiding a problem in the prior art that user device is distinguished by using only a C-RNTI and a requirement of M2M for multiple services cannot be satisfied.

Figure 6:
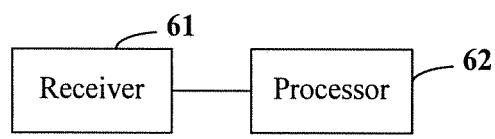
FIG. 6 is a schematic structural diagram of user device according to another embodiment of the present invention.

FIG. 6 is a schematic structural diagram of user device according to another embodiment of the present invention. The user device provided in this embodiment is configured to implement the method shown in FIG. 2, and includes: a receiver 61 and a processor 62.

The receiver 61 is configured to receive a cell radio network temporary identifier C-RNTI and an extension identifier that are allocated to first user device, where a combination of the extension identifier and the C-RNTI is used to identify the first user device, where the receiver 61 is configured to receive DCI that is scrambled by using the C-RNTI, where the scrambled DCI carries the C-RNTI and the extension identifier, or is configured to receive a Medium Access Control control element MAC CE and DCI that is scrambled by using the C-RNTI, where the MAC CE carries the extension identifier; and the processor 62 is configured to communicate with a network according to the DCI when it is determined that the C-RNTI received by the receiver 61 and the C-RNTI in the scrambled DCI are the same and the extension identifier received by the receiver 61 and the extension identifier carried in the DCI are the same, or configured to communicate with a network according to the DCI when it is determined that the C-RNTI received by the receiver 61 and the C-RNTI in the scrambled DCI are the same and the extension identifier received by the receiver 61 and the extension identifier carried in the MAC CE are the same.

Further, the processor 62 may be further configured to:

save the C-RNTI and the extension identifier after the receiver 61 receives the cell radio network temporary identifier C-RNTI and the extension identifier that are allocated to the first user device.

Further, the receiver 61 may be configured to receive a notified time frequency resource configuration; and the processor 62 may be configured to communicate with the network according to the DCI when it is determined in the time frequency resource configuration received by the receiver 61 that the C-RNTI received by the receiver 61 and the C-RNTI in the scrambled DCI are the same and the extension identifier received by the receiver 61 and the extension identifier carried in the DCI are the same, or may be configured to communicate with the network according to the DCI when it is determined in the time frequency resource configuration received by the receiver 61 that the C-RNTI received by the receiver 61 and the C-RNTI in the scrambled DCI are the same and the extension identifier received by the receiver 61 and the extension identifier carried in the MAC CE are the same.

In the foregoing user device embodiment, user device is identified by using a combination of a C-RNTI and an extension identifier, thereby resolving a problem that C-RNTIs in a cellular communications system are insufficient, so that a capacity of a wireless communications network can be expanded to accommodate more users, and avoiding a problem in the prior art that user device is distinguished by using only a C-RNTI and a requirement of M2M for multiple services cannot be satisfied.

An embodiment of the present invention further provides a computer program product, where the computer program product includes a computer readable medium, where the readable medium includes a first group of program code, and is configured to execute steps in the method shown in FIG. 1:

allocating a cell radio network temporary identifier C-RNTI and an extension identifier to first user device, where a combination of the extension identifier and the C-RNTI is used to identify the first user device;

notifying the first user device of the C-RNTI and the extension identifier;

scrambling downlink control information DCI of the first user device by using the C-RNTI; and sending the scrambled DCI, where the scrambled DCI carries the C-RNTI and the extension identifier, so that the first user device communicates with a network according to the DCI when determining that the notified C-RNTI and the C-RNTI in the scrambled DCI are the same and the notified extension identifier and the extension identifier carried in the DCI are the same; or sending a Medium Access Control control element MAC CE and the scrambled DCI, where the MAC CE carries the extension identifier, so that the first user device communicates with a network according to the DCI when determining that the notified C-RNTI and the C-RNTI in the scrambled DCI are the same and the notified extension identifier and the extension identifier carried in the MAC CE are the same.

Further, the allocating a C-RNTI to first user device includes:

establishing a mapping relationship between C-RNTIs and user devices; and selecting a C-RNTI according to the mapping relationship, to allocate the C-RNTI to user device corresponding to the C-RNTI.

Further, after the notifying the first user device of the C-RNTI and the extension identifier, the method further includes:

adding the C-RNTI and the extension identifier to a context of the first user device; and reserving the context, to which the C-RNTI and the extension identifier are added, of the first user device.

Further, the method further includes:

if the same C-RNTI is allocated to second user device and the first user device, reallocating a C-RNTI that is different from the C-RNTI allocated to the first user device to the second user device; or if the same C-RNTI is allocated to the first user device and second user device, reallocating a C-RNTI that is different from the C-RNTI allocated to the first user device to the first user device.

Further, the allocating a cell radio network temporary identifier C-RNTI and an extension identifier to first user device includes:

using the combination of the C-RNTI and the extension identifier in a configured time frequency resource, to identify the first user device.

Further, the sending the C-RNTI and the extension identifier to the first user device further includes:

notifying the first user device of the configured time frequency resource.

In the foregoing embodiment, user device is identified by using a combination of a C-RNTI and an extension identifier, thereby resolving a problem that C-RNTIs in a cellular communications system are insufficient, so that a capacity of a wireless communications network can be expanded to accommodate more users, and avoiding a problem in the prior art that user device is distinguished by using only a C-RNTI and a requirement of M2M for multiple services cannot be satisfied.

In addition, an embodiment of the present invention further provides a computer program product, where the computer program product includes a computer readable medium, where the readable medium includes a second group of program code, and is configured to execute steps in the method shown in FIG. 2:

receiving a cell radio network temporary identifier C-RNTI and an extension identifier that are allocated to first user device, where a combination of the extension identifier and the C-RNTI is used to identify the first user device; and receiving DCI that is scrambled by using the C-RNTI, where the scrambled DCI carries the C-RNTI and the extension identifier, and communicating with a network according to the DCI when it is determined that the received C-RNTI and the C-RNTI in the scrambled DCI are the same and the received extension identifier and the extension identifier carried in the DCI are the same; or receiving a Medium Access Control control element MAC CE and DCI that is scrambled by using the C-RNTI, where the MAC CE carries the extension identifier, and communicating with a network according to the DCI when it is determined that the received C-RNTI and the C-RNTI in the scrambled DCI are the same and the received extension identifier and the extension identifier carried in the MAC CE are the same.

Further, after the receiving a cell radio network temporary identifier C-RNTI and an extension identifier that are allocated to first user device, the method further includes:

saving the C-RNTI and the extension identifier.

Further, the method further includes:

receiving a notified time frequency resource configuration;

the communicating with a network according to the DCI when it is determined that the received C-RNTI and the C-RNTI in the scrambled DCI are the same and the received extension identifier and the extension identifier carried in the DCI are the same includes:

communicating with the network according to the DCI when it is determined in the notified time frequency resource configuration that the received C-RNTI and the C-RNTI in the scrambled DCI are the same and the received extension identifier and the extension identifier carried in the DCI are the same; and the communicating with a network according to the DCI when it is determined that the received C-RNTI and the C-RNTI in the scrambled DCI are the same and the received extension identifier and the extension identifier carried in the MAC CE are the same includes:

communicating with the network according to the DCI when it is determined in the notified time frequency resource configuration that the received C-RNTI and the C-RNTI in the scrambled DCI are the same and the received extension identifier and the extension identifier carried in the MAC CE are the same.

In the foregoing embodiment, user device is identified by using a combination of a C-RNTI and an extension identifier, thereby resolving a problem that C-RNTIs in a cellular communications system are insufficient, so that a capacity of a wireless communications network can be expanded to accommodate more users, and avoiding a problem in the prior art that user device is distinguished by using only a C-RNTI and a requirement of M2M for multiple services cannot be satisfied.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A downlink information sending method, comprising:
   allocating a cell radio network temporary identifier (C-RNTI) and an extension identifier to a first user device, wherein a combination of the extension identifier and the C-RNTI is used to identify the first user device;
   notifying the first user device of the C-RNTI and the extension identifier;
   scrambling downlink control information (DCI) of the first user device by using the C-RNTI; and
   sending the scrambled DCI, wherein the scrambled DCI carries the C-RNTI and the extension identifier for communicating with a network according to the DCI when determining that the notified C-RNTI and the C-RNTI in the scrambled DCI are the same and the notified extension identifier and the extension identifier carried in the DCI are the same, or
   sending a Media Access Control control element (MAC CE) and the scrambled DCI, wherein the MAC CE carries the extension identifier, so that the first user device communicates with a network according to the DCI when determining that the notified C-RNTI and the C-RNTI in the scrambled DCI are the same and the notified extension identifier and the extension identifier carried in the MAC CE are the same.

2. The method according to claim 1, wherein allocating a C-RNTI to a first user device comprises:
   establishing a mapping relationship between C-RNTIs and user devices; and
   selecting a C-RNTI according to the mapping relationship, to allocate the C-RNTI to user device corresponding to the C-RNTI.

3. The method according to claim 1, wherein after notifying the first user device of the C-RNTI and the extension identifier, the method further comprises:
   adding the C-RNTI and the extension identifier to a context of the first user device; and
   reserving the context, to which the C-RNTI and the extension identifier are added, of the first user device.

4. The method according to claim 1, further comprising:
   if the same C-RNTI is allocated to second user device and the first user device, reallocating a C-RNTI that is different from the C-RNTI allocated to the first user device to the second user device; or
   if the same C-RNTI is allocated to the first user device and second user device, reallocating a C-RNTI that is different from the C-RNTI allocated to the first user device to the first user device.

5. The method according to claim 1, wherein allocating a cell radio network temporary identifier C-RNTI and an extension identifier to first user device comprises:
   using the combination of the C-RNTI and the extension identifier in a configured time frequency resource, to identify the first user device.

6. The method according to claim 5, wherein sending the C-RNTI and the extension identifier to the first user device further comprises:
   notifying the first user device of the configured time frequency resource.

7. A downlink information receiving method, comprising:
   receiving a cell radio network temporary identifier (C-RNTI) and an extension identifier that are allocated to a first user device, wherein a combination of the extension identifier and the C-RNTI is used to identify the first user device; and
   receiving downlink control information (DCI) that is scrambled by using the C-RNTI, wherein the scrambled DCI carries the C-RNTI and the extension identifier, and communicating with a network according to the DCI when it is determined that the received C-RNTI and the C-RNTI in the scrambled DCI are the same and the received extension identifier and the extension identifier carried in the DCI are the same, or
   receiving a Medium Access Control control element (MAC CE) and DCI that is scrambled by using the C-RNTI, wherein the MAC CE carries the extension identifier, and communicating with a network according to the DCI when it is determined that the received C-RNTI and the C-RNTI in the scrambled DCI are the same and the received extension identifier and the extension identifier carried in the MAC CE are the same.

8. The method according to claim 7, wherein after receiving a cell radio network temporary identifier C-RNTI and an extension identifier that are allocated to first user device, the method further comprises:
saving the C-RNTI and the extension identifier.

9. The method according to claim 7, wherein:
the method further comprises:
receiving a notified time frequency resource configuration;
communicating with a network according to the DCI when it is determined that the received C-RNTI and the C-RNTI in the scrambled DCI are the same and the received extension identifier and the extension identifier carried in the DCI are the same comprises:
communicating with the network according to the DCI when it is determined in the notified time frequency resource configuration that the received C-RNTI and the C-RNTI in the scrambled DCI are the same and the received extension identifier and the extension identifier carried in the DCI are the same; and
communicating with a network according to the DCI when it is determined that the received C-RNTI and the C-RNTI in the scrambled DCI are the same and the received extension identifier and the extension identifier carried in the MAC CE are the same comprises:
communicating with the network according to the DCI when it is determined in the notified time frequency resource configuration that the received C-RNTI and the C-RNTI in the scrambled DCI are the same and the received extension identifier and the extension identifier carried in the MAC CE are the same.

10. A base station, comprising:
a processor, configured to:
allocate a cell radio network temporary identifier (C-RNTI) and an extension identifier to a first user device, wherein a combination of the extension identifier and the C-RNTI is used to identify the first user device, and
scramble downlink control information (DCI) of the first user device by using the C-RNTI allocated to the first user device; and
a transmitter, configured to:
notify the first user device of the C-RNTI and the extension identifier that are allocated by the processor, and
send the DCI scrambled by the processor to the first user device, wherein the scrambled DCI carries the C-RNTI and the extension identifier, so that the first user device communicates with a network according to the DCI when determining that the notified C-RNTI and the C-RNTI in the scrambled DCI are the same and the notified extension identifier and the extension identifier carried in the DCI are the same; or
send a Medium Access Control control element (MAC CE) and the DCI that is scrambled by the processor to the first user device, wherein the MAC CE carries the extension identifier, so that the first user device communicates with a network according to the DCI when determining that the notified C-RNTI and the C-RNTI in the scrambled DCI are the same and the notified extension identifier and the extension identifier carried in the MAC CE are the same.

11. The base station according to claim 10, wherein the processor is further configured to:
establish a mapping relationship between C-RNTIs and user devices; and
select a C-RNTI according to the mapping relationship, to allocate the C-RNTI to user device corresponding to the C-RNTI.

12. The base station according to claim 10, wherein the processor is further configured to:
add the C-RNTI and the extension identifier to a context of the first user device after the transmitter notifies the first user device of the C-RNTI and the extension identifier; and
reserve the context, to which the C-RNTI and the extension identifier are added, of the first user device.

13. The base station according to claim 10, wherein the processor is further configured to:
if the same C-RNTI is allocated to a second user device and the first user device, reallocate a C-RNTI that is different from the C-RNTI allocated to the first user device to the second user device, or is configured to:
when the same C-RNTI is allocated to the first user device and a second user device, reallocate a C-RNTI that is different from the C-RNTI allocated to the first user device to the first user device.

14. The base station according to claim 10, wherein the processor is further configured to:
use the combination of the C-RNTI and the extension identifier in a configured time frequency resource, to identify the first user device.

15. The base station according to claim 14, wherein the transmitter is further configured to:
notify the first user device of the configured time frequency resource.

16. A user device, comprising:
a receiver, configured to:
receive a cell radio network temporary identifier (C-RNTI) and an extension identifier that are allocated to first user device, wherein a combination of the extension identifier and the C-RNTI is used to identify the first user device, and
receive downlink control information (DCI) that is scrambled by using the C-RNTI, wherein the scrambled DCI carries the C-RNTI and the extension identifier; or
receive a Medium Access Control control element (MAC CE) and DCI that is scrambled by using the C-RNTI, wherein the MAC CE carries the extension identifier; and
a processor, configured to:
communicate with a network according to the DCI when it is determined that the C-RNTI received by the receiver and the C-RNTI in the scrambled DCI are the same and the extension identifier received by the receiver and the extension identifier carried in the DCI are the same, or
communicate with a network according to the DCI when it is determined that the C-RNTI received by the receiver and the C-RNTI in the scrambled DCI are the same and the extension identifier received by the receiver and the extension identifier carried in the MAC CE are the same.

17. The user device according to claim 16, wherein the processor is further configured to:
save the C-RNTI and the extension identifier after the receiver receives the cell radio network temporary identifier C-RNTI and the extension identifier that are allocated to the first user device.

18. The user device according to claim 16, wherein:
the receiver is configured to receive a notified time frequency resource configuration; and
the processor is configured to:
  communicate with the network according to the DCI when it is determined in the time frequency resource configuration received by the receiver that the C-RNTI received by the receiver and the C-RNTI in the scrambled DCI are the same and the extension identifier received by the receiver and the extension identifier carried in the DCI are the same, or
  communicate with the network according to the DCI when it is determined in the time frequency resource configuration received by the receiver that the C-RNTI received by the receiver and the C-RNTI in the scrambled DCI are the same and the extension identifier received by the receiver and the extension identifier carried in the MAC CE are the same.

* * * * *